Feb. 4, 1930.  S. FEILER  1,745,365
DECORATIVE ARTICLE
Filed Aug. 22, 1928
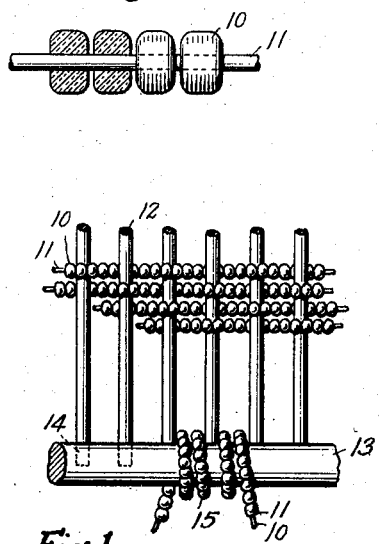
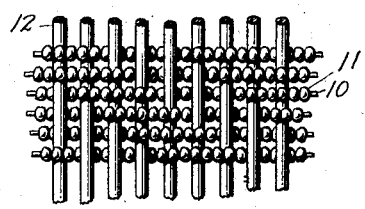
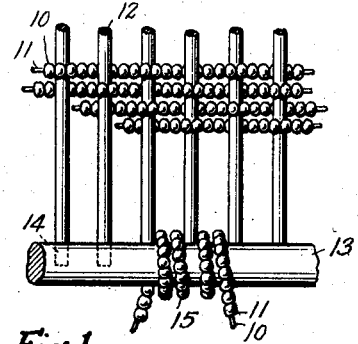
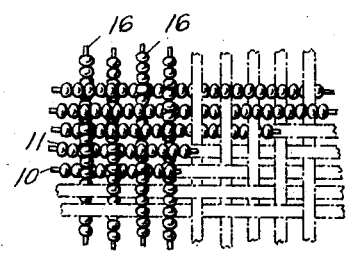
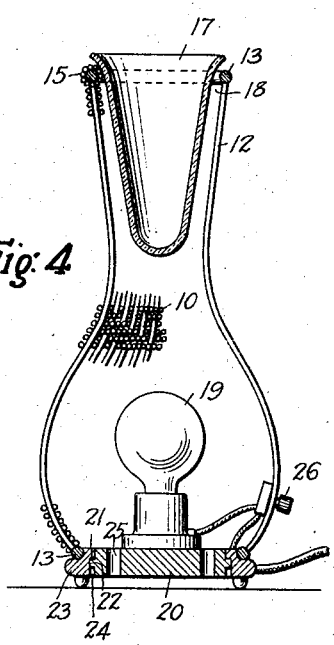
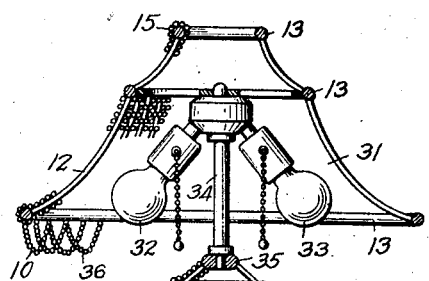
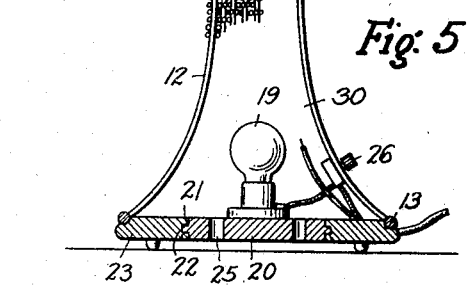
INVENTOR
Saul Feiler
BY
ATTORNEY Patented Feb. 4, 1930

1,745,365

UNITED STATES PATENT OFFICE

SAUL FEILER, OF NEW YORK, N. Y.

DECORATIVE ARTICLE

Application filed August 22, 1928. Serial No. 301,273.

This invention relates to woven bodies for various types of articles such as articles of furniture, decorative articles and the like, and relates further to such articles as may be made largely of strung beads.

My invention contemplates the interweaving of strung beads to produce all or any part of the bodies of various types of articles such as, for instance, lamps, vases, chandeliers, chandelier globes, pocket-books, jewelry boxes, furniture, baby carriages and similar articles, wherein reed or cane might have previously been used. Said beads are strung in advance on the stringing therefor, and may be made of glass, steel, bakelite or any other suitable composition capable of producing the desirable light and shade and variegated color effects hereinafter mentioned.

The various objects of my invention will be clear from the description which follows and from the drawings, in which, Fig. 1 is a front view of part of the body of an article illustrating how my invention is applied to the weaving of said article.

Fig. 2 is a similar view of the same, showing a modified form of the weave.

Fig. 3 is a similar view of the same, showing how strung beads may be employed for the warp members of the woven body.

Fig. 4 is a vertical section of a vase, showing how my invention may be applied thereto, and showing an illuminating lamp adapted to give various color effects when lighted.

Fig. 5 is a similar view of a lamp stand to which my invention has been applied.

Fig. 6 is a bottom plan view of the bottom of the article showing the bayonet lock preferably used for the lamp base, and Fig. 7 is a partial vertical section and front view of part of a string of beads.

In the practical embodiment of my invention which I have illustrated by way of example, suitable beads as 10 are strung in advance upon the stringing 11.

Said beads 10 may be made of any suitable and preferably translucent or transparent material, such as coral, amber, glass, or the like, bakelite or other similar colorable and translucent material, or the beads may be made of polished steel or other suitable strong and opaque material. The surfaces of the beads may be cut as is well known in the art, to make said beads sparkling or iridescent and to cause them to reflect light. The stringing 11 for the various strings is made of material having sufficient tensile strength to resist breakage of the stringing, such as for instance, string, wire, gut or other suitable material.

Referring now to Fig. 1, I have there shown a series of warp members 12 which serve as the foundation for the woven body. Said members 12 are made of any suitable material, such as wire, reed, wood dowels or the like, and may be shaped to the desired form and secured to a ring or frame 13, as by inserting said members into suitable holes 14 made in said ring or frame. The string of beads is sufficiently flexible to allow it to be easily handled and woven over and under the various warp members to form what I will term the weft members of the body. If it is desired that the framework of the article be covered with beads, the strung beads may simply be wound about said ring in closely wound convolutions as indicated at 15. Even though the strings of beads be woven as closely as possible across the warp members, numerous small openings are left nevertheless throughout the body. I have utilized said openings not only for ventilation purposes but also for obtaining certain color effects as will appear more fully hereinafter.

It will be understood that any type of weave or braid may be used in the formation of the body of the article to which my invention is applied, and that the weave illustrated in Fig. 1 is merely one example thereof. Other examples are well known in the art of caning and need not therefore be described in detail. I have shown, however, another form of weave in Figs. 2 and 3, to indicate that the strung beads are well adapted to be woven to produce any desired design in a manner well known to those skilled in the caning art, and which will now be obvious.

For the substantially stiff and comparatively inflexible warp members 12, the strung bead members 16 may be substituted if desired, to serve as warp members and to provide a woven body presenting a beaded appearance throughout. It will be understood that beads of various colors and of varying degrees of translucency or opaqueness may be alternated in any desired manner on any string, and that different strings arranged across different rows of the warp members may have different colors if desired to accentuate the coloration of the resulting article, and that the warp members may also be made in variegated colors as desired.

In order to illustrate how my improved beaded body may be used for the manufacture of lamp stands, vases and the like, I have in Fig. 4, shown my invention applied to a vase adapted to be lighted by a lamp inside thereof. In said vase, the warp members may be suitably shaped and the weft members arranged in accordance with any of the weaves illustrated in Figs. 1 to 3 inclusive, or in accordance with any other weave which may be desired. The body may terminate in suitable rings or frames as 13 at the top and bottom thereof for maintaining the proper shape of the body. The glass container 17 of colored glass, if desired, may be inserted in the open end 18 of the vase for holding flowers and the like.

In order to produce various color effects as well as various lighting effects, I prefer to insert an electric lamp as 19 into the body of the article. As shown in Fig. 4, said lamp is mounted upon a detachable base as 20 by means of the tongues 21 operating in the groove 22 of the base member 23. At spaced intervals corresponding to the spacing of the tongues 21, upright slots as 24, each of the same depth as the groove 22, extend from said groove to the bottom of the base 23 so as to provide a bayonet lock for the member 20. Suitable holes as 25 may be made in said base for allowing air to circulate through the interior of the vase and out through the spaces between the weft members so that the body does not become unduly heated by the heat of the lamp 19. A suitable switch as 26 may be provided in the usual manner for controlling the lighting of the lamp 19. Said lamp may be of any desired color contrasting with the color of the beads 10 or the warp members or corresponding therewith if desired, so as to produce pleasing color effects by the casting of colored light on the beads in various amounts and thereby producing a shaded lighting effect as well as pleasing harmonious or contrasting color effects. By changing the lamp 19 for one of another color, the effect may be varied.

Referring now to Fig. 5, I have there shown a lamp stand comprising the support 30 and the shade 31. Excepting for the frame work of the lamp and shade, the body thereof may be made throughout of strung beads woven across the warp members, which may also be of strung beads, or of the materials previously described. For additional decoration, suitable fringes 36, also of strung beads may be suspended from one of the rings 13 forming the frame work of the shade. The lamp 19 of the lamp stand may be mounted similarly to that shown in connection with the vase in Fig. 4 and for the same purposes. In addition, the lamps 32 and 33 of the same or different colors may be supported by the lamp stand as by means of the support 34 secured to the frame member 35 of said stand.

After the body of the article, and the fringes thereon, if any, have been made, the entire article may be glue-sized for maintaining the stiffness of the strung beads and preventing possible distortion. It will be understood that any suitable material may be used for the sizing instead of glue, such as for instance, varnish, shellac and the like.

Articles made of my improved woven body may be dropped with impunity and are not likely to break or become distorted.

Such articles present a pleasing appearance by reason of the reflection of light therefrom, the varied light and shade effects thus produced, and the various colors in numerous designs which are obtainable from such weaving.

It will be seen that my improved woven body may be applied to a great variety of different articles which need not be specifically mentioned excepting to say that such a body is applicable to all articles which may be woven of reed or cane.

It will be understood that while I have shown and described specific embodiments of my invention, I do not intend to limit myself thereto, but that I intend to claim my invention as broadly as may be permitted by the state of the prior art and the terms of the appended claims.

I claim:

1. In a decorative article, a self-braced body of two interwoven sets of members, at least one set of said members comprising substantially parallel strings of beads woven across the other set, and means in the interior of said article for illuminating said article and said beads and thereby producing predetermined lighting effects.

2. In a substantially rigid decorative article, a self-sustaining woven body comprising warp members and weft members consisting of strings of beads of predetermined colors woven across and in front and behind spaced warp members and means for illuminating said body and for producing variegated lighting and color effects, comprising colored illuminating means in the interior of said article.

3. In a substantially rigid decorative article, a self-sustaining body of interwoven strings of colored beads, including means for maintaining said strings of beads against distortion in the shape into which they are woven, and a lamp arranged in the interior of said article for producing variegated color and lighting effects.

4. In a substantially rigid decorative article, a self-sustaining woven portion consisting of strings of beads, and means for supporting said strings including shaped warp members about which said strings are interwoven, said strings of beads being woven to leave small openings near the warp members for the passage of light therethrough, and illuminating means in the interior of said article.

5. In a decorative article, a self-sustaining woven portion comprising interwoven strings of beads of different colors, substantially parallel and comparatively closely spaced warp members behind and in front of which said strings are woven for maintaining the shape of said article, said warp members being at substantially right angles to said strings, said strings being woven so as to provide comparatively small openings for the passage of light therethrough, a lamp in the interior of said article, a base for supporting said lamp, and means for removably supporting said base whereby said base may be removed from the article and a lamp of different color substituted.

6. In a decorative article, a self-sustained body comprising interwoven strings of beads, a frame interwoven with said strings a lamp adapted to be arranged in the interior of said article for illuminating said beads, and means for removably securing said lamp in place whereby a lamp of different color may be substituted to change the lighting effect.

7. In a substantially rigid illuminating device, a removable lamp in the interior of the device, and self-sustaining means for producing variegated lighting and color effects comprising the body of said article, said means including a series of substantially parallel and comparatively closely spaced warp members bent permanently into predetermined shape, and a series of substantially parallel strings of beads differing in color, woven in front of some of said warp members and behind others of said warp members whereby said body is permanently shaped and self-maintained against distortion, and produces substantially the same lighting effect under varying conditions of stress put thereupon.

SAUL FEILER.